(12) United States Patent
Rosselot

(10) Patent No.: US 7,715,445 B1
(45) Date of Patent: May 11, 2010

(54) SYSTEM AND METHOD FOR MINIMIZING TRANSMIT LATENCY UNCERTAINTY IN 100 MB RMII ETHERNET PHYSICAL LAYER DEVICES

(75) Inventor: David R. Rosselot, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 1065 days.

(21) Appl. No.: 11/374,874

(22) Filed: Mar. 14, 2006

(51) Int. Cl.
*H04J 3/06* (2006.01)

(52) U.S. Cl. .................. 370/518; 710/10; 710/104

(58) Field of Classification Search ............... None
See application file for complete search history.

(56) References Cited

U.S. PATENT DOCUMENTS

| | | | | |
|---|---|---|---|---|
| 4,029,900 A | * | 6/1977 | Addeo | 375/365 |
| 5,313,496 A | * | 5/1994 | de Goede | 375/342 |
| 6,008,746 A | * | 12/1999 | White | 341/70 |
| 6,275,498 B1 | * | 8/2001 | Bisceglia et al. | 370/438 |
| 6,813,729 B1 | | 11/2004 | Tsang et al. | |
| 6,865,189 B2 | | 3/2005 | Senthil et al. | |
| 6,950,490 B1 | * | 9/2005 | Koh et al. | 377/46 |
| 6,954,425 B2 | | 10/2005 | Chen et al. | |
| 7,451,243 B2 | * | 11/2008 | Coleman | 710/10 |

OTHER PUBLICATIONS

"RMII Consortium, RMII Specification", Mar. 20, 1998, 17 pages.
"DP83848C PHYTER—Commercial Temperature Single Port 10/100 Mb/s Ethernet Physical Layer Transceiver", National Semiconductor, Sep. 2005, 82 pages.

* cited by examiner

*Primary Examiner*—Phuc Tran

(57) ABSTRACT

A system and method for minimizing transmit latency uncertainty in a 100 Mb RMII Ethernet physical layer device is disclosed. A 100 Mb RMII Ethernet transmit physical layer device comprises a divide circuit that selects a phase of a transmit clock signal for transmitting data. The invention comprises a reset circuit that aligns the divide circuit to select an optimal phase of the transmit clock signal for transmitting data. The reset circuit of the invention is capable of reducing the transmit latency uncertainty from approximately twenty nanoseconds to four nanoseconds.

20 Claims, 7 Drawing Sheets

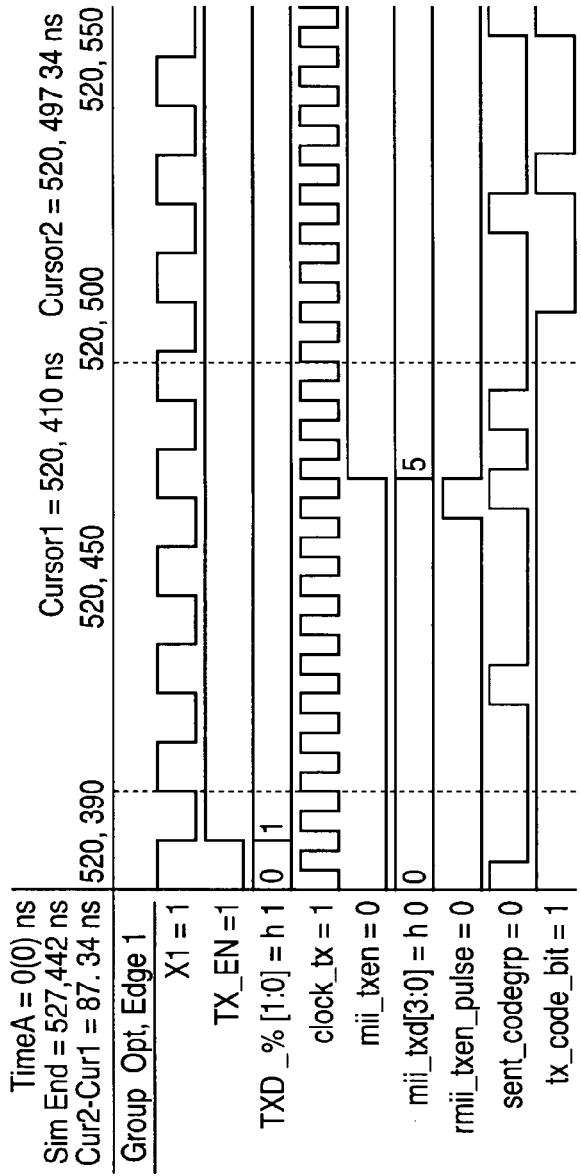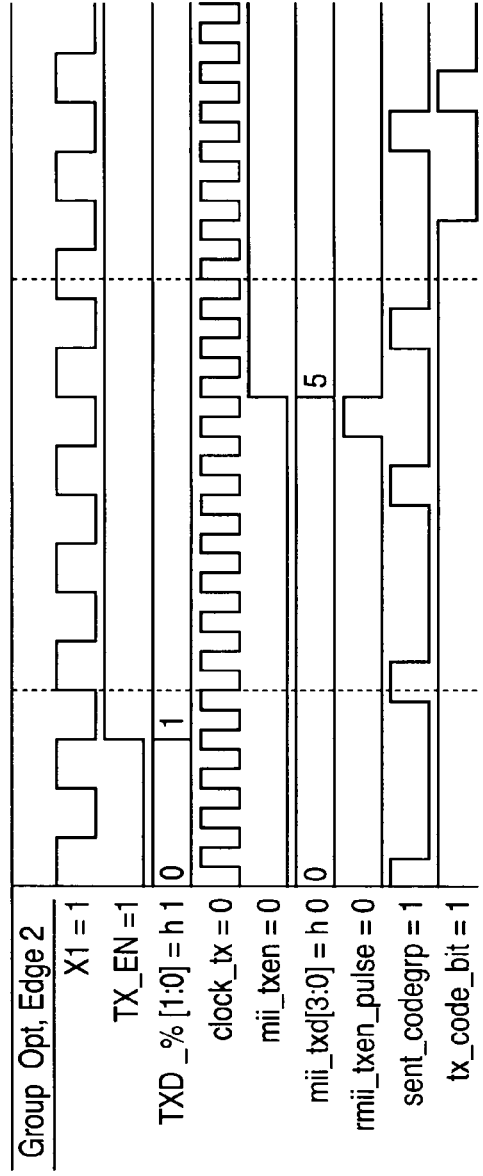
FIG. 10A
FIG. 10B

SYSTEM AND METHOD FOR MINIMIZING TRANSMIT LATENCY UNCERTAINTY IN 100 MB RMII ETHERNET PHYSICAL LAYER DEVICES

TECHNICAL FIELD OF THE INVENTION

The present invention is generally directed to Ethernet physical layer devices and, in particular, to a system and method for minimizing transmit latency uncertainty in 100 Mb RMII Ethernet physical layer devices.

BACKGROUND OF THE INVENTION

In industrial Ethernet and other real-time networking applications, latency for data transmission is an important issue. Minimizing the total latency is important. But perhaps even more important is minimizing any uncertainty in the latency. In Reduced Media Independent Interface™ (RMII™) based Ethernet systems, one problem is that transmit latency includes an uncertainty based on the relationship between the RMII™ reference clock and the transmit clock that is used to transmit the data on the physical medium.

The Reduced Media Independent Interface™ (RMII™) Specification ("RMII™ Specification") published by the RMII Consortium sets forth an interface protocol for communications between Ethernet physical layer devices and application specific integrated circuit (ASIC) devices. The materials set forth in the RMII™ Specification are hereby incorporated herein by reference. Reduced Media Independent Interface™ is a trademark of the RMII Consortium. For clarity this patent document will not place the trademark designator TM on each reference to the initials RMII. It is understood that the initials RMII represent a trademark.

The RMII Specification defines an interface for transferring Ethernet packet data from a Media Access Controller or Switch to an Ethernet physical layer device. The RMII Specification describes the use of a fifty megahertz (50 MHz) reference clock to transfer data in two-bit increments. The two-bit increments are also referred to as "di-bit" increments.

The operation of a physical layer device is described in an IEEE publication entitled "IEEE Standards for Local and Metropolitan Area Networks: Media Access Control (MAC) Parameters, Physical Layer, Medium Attachment Units, and Repeater for 100 Mb/s Operation, Type 100BASE-T." The short name of this standard is IEEE Standard 802.3. Within a physical layer device, as defined by the IEEE 802.3 specification, the one hundred megabit (100 Mb) data is transmitted as code-group data, which is a 4B5B encoding of four bit ("nibble") data.

Due to the nature of the clock and data generation, there is no known relationship between the phase of the fifty megaHertz (50 MHz) reference clock that is used to initiate each nibble of data transfer and the phase of the one hundred twenty five megaHertz (125 MHz) transmit clock that samples that data for transmission to the Physical Layer. The lack of a known relationship between the phase of the two clocks results in a minimum twenty nanosecond (20 ns) uncertainty in the latency for transmitting the data as measured between the reference clock at the RMII and the actual transmission of the data on the physical medium. The twenty nanosecond (20 ns) time interval represents one clock period of the fifty megahertz (50 MHz) clock.

There is a need in the art for a system and method that is capable of minimizing the transmit latency uncertainty in 100 Mb RMII Ethernet physical layer devices. In particular, there is a need in the art for a system and method that can significantly reduce the transmit latency uncertainty from its present value of approximately twenty nanoseconds (20 ns).

In order to better understand the advance in the art that the present invention provides, a prior art system and method will first be described. FIG. 1 illustrates a system timing diagram for a prior art RMII System 100. FIG. 1 shows the basic components of a single transmit-to-receive Ethernet path from the Transmit Media Access Controller 110 ("Transmit Mac 110") to the Receive Media Access Controller 120 ("Receive Mac 120"). Transmit Mac 100 sends the data to the Transmit physical layer device 130 ("Transmit Phy 130"). The Transmit Mac 110 sends a transmit enable signal ("TX_EN") to the Transmit Phy 130 to enable the transmission of data. The data is sent over the link that is designated TXD[1:0] between the Transmit Mac 110 and the Transmit Phy 130.

The Transmit Phy 130 sends the data over a Category 5 cable 140 ("Cat5 Cable 140"). The data from the Cat5 Cable 140 is received by the Receive physical layer device 150 ("Receive Phy 150"). The Receive Phy 150 sends the data to the Receive Mac 120. The Receive Phy 150 sends a receive enable signal ("RX_DV") to the Receive Mac 120 to enable the receipt of data. The data is sent over the link that is designated RXD[1:0] between the Receive Phy 150 and the Receive Mac 120.

A fifty megaHertz (50 MHz) first reference clock 160 ("REF_CLK1 160") is coupled to the Transmit Mac 110 and to the Transmit Phy 130. A fifty megaHertz (50 MHz) second reference clock 170 ("REF_CLK2 170") is coupled to the Receive Phy 150 and to the Receive Mac 120. The first reference clock 160 and the second reference clock 170 are each accurate to a precision of fifty parts per million (+/−50 ppm). The two reference clocks are independent.

RMII system latency is the delay from the Transmit Mac 110 to the Receive Mac 120 as measured at the RMII interface. Transmit RMII data is generated based on the first reference clock 160 (REF_CLK1 160). Receive RMII data is generated based on the second reference clock 170 (REF_CLK2 170).

The total transit time of the link from measurement at the Transmit RMII interface to the Receive RMII interface is given by the expression:

$$tpTotalPhyRMII = tpPhyTxRMII + tpCable + tpPhyRxRMII$$

The expression "tpTotalPhyRMII" represents the total transit time of the link. The expression "tpPhyTxRMII" represents the transit time through the Transmit Phy 130. The expression "tpCable" represents the transit time through the Cat5 Cable 140. The expression "tpPhyRxRMII" represents the transit time through the Receive Phy 150. The sum of these three expressions represents the RMII system latency.

We now consider just the RMII Transmit latency. The RMII Transmit latency may be measured from transmit data at the RMII interface to the first bit transmitted on the Cat5 Cable 140. It is understood that while Category 5 cable is the type most often used, other types of cable may be used to connect the Transmit Phy 130 and the Receive Phy 150.

To eliminate system dependencies at the RMII interface (i.e., transmit data setup to REF_CLK1 160), measurement is made from the rising edge of the REF_CLK1 160 clock signal that samples the transmit data. The measurement is made from the assertion of the transmit enable signal TX_EN to the first bit of JK on the cable. The code-group J and the code-group K are the first code-groups in a Start of Stream Delimiter ("SSD").

Because the latency is consistent for all transmit data nibbles, measurements can be made from the Start of Frame Delimiter ("SFD") or any other data in the data packet.

FIG. 2 illustrates how the "tpPhyTxRMII" transit time through the Transmit Phy 130 is measured. FIG. 2 illustrates a diagram showing the transmit delay in a prior art RMII transmit physical layer device. The first waveform 210 in FIG. 2 is the clock signal REF_CLK1 of the first reference clock 160. The second waveform 220 in FIG. 2 is the transmit enable signal TX_EN. The third waveform 230 in FIG. 2 is the data transmission signal TXD[1:0]. The fourth waveform 240 in FIG. 2 is the transmit delay (TD) waveform.

As shown in FIG. 2, the point in time from which the tpPhyTxRMII interval is measured is on the leading edge of the first REF_CLK1 pulse that samples the asserted transmit enable signal TX_EN. The end of the tpPhyTxRMII interval is located at the beginning of the code-group J on the transmit delay (TD) waveform. The tpPhyTxRMII interval is represented in FIG. 2 by an arrow that extends between a first vertical line that marks the beginning of the appropriate REF_CLK1 pulse and a second vertical line that marks the beginning of the code-group J. The tpPhyTxRMII interval represents the RMII Transmit latency.

The Phy Transmit process may be broken down into components. The Transmit Phy 130 processes data in the following stages. First, the data is subjected to an RMII to MII translation process that converts di-bits to nibbles. Second, the data then is processed in a 100BASE-X Physical Coding Sublayer ("PCS") unit. Third, the data is then processed in a 100BASE-X Physical Medium Attachment ("PMA") unit. Fourth, the data is then processed in a 100BASE-X Physical Medium Dependent ("PMD") sublayer unit.

The latency uncertainty in the transmitter is contained in the RMII to MII translation process and in the Physical Coding Sublayer ("PCS") unit. The implementations of the Physical Medium Attachment ("PMA") unit and the Physical Medium Dependent ("PMD") sublayer unit depend on the actual medium that is selected (e.g., copper cable or optical fiber) and are not significant to the determination of the transmit latency uncertainty. Therefore, only the RMII to MII translation and the operation of the Physical Coding Sublayer ("PCS") unit are pertinent to the determination of the transmit latency uncertainty.

FIG. 3 illustrates a block diagram 300 of a prior art RMII to MII Translation unit 310 and a prior art Physical Coding Sublayer ("PCS") unit 320. The inputs to the RMII to MII Translation unit 310 from the Transmit Mac 110 are the transmit enable signal TX_EN and the data signal TXD[1:0]. The RMII to MII Translation unit 310 also receives the REF_CLK1 signal from the first reference clock 160. Because the second reference clock 170 is not involved in the determination of the transmit latency uncertainty, the first reference clock signal REF_CLK1 will simply be referred to as the reference clock signal REF_CLK.

As shown in FIG. 3, the 50 MHz REF_CLK signal is provided to a Clock Multiplier unit 330. The Clock Multiplier unit 330 multiplies the clock signal REF_CLK signal to obtain a one hundred twenty five megaHertz (125 MHz) Transmit Clock signal. The Clock Multiplier unit 330 provides the 125 MHz Transmit Clock signal to both the RMII to MII Translation unit 310 and the Physical Coding Sublayer ("PCS") unit 320.

The operation of the Physical Coding Sublayer ("PCS") unit 320 will now be described. The PCS unit 320 comprises a 4B5B Encoder 340, a Serializer 350, a Transmit Bits State Machine 360, and a Transmit State Machine 370. The output of the PCS unit 320 is provided to a Physical Medium Attachment ("PMA") unit (not shown in FIG. 3). The operation of the PCS unit 320 is described in Clause 24 of the IEEE 802.3 Specification.

The PCS unit 320 receives and encodes 4-bit (nibble) packet data in the 4B5B Encoder 340. The Transmit Bits State Machine 360 controls the operation of the 4B5B Encoder 340 and the Transmit State Machine 370. The 4B5B Encoder 340 provides the encoded data in the form of 5-bit code-groups to Serializer 350. Serializer 350 uses the 5-bit code-groups to create code_bit output and provides the code_bit output to the PMA unit (not shown in FIG. 3).

The PCS unit 320 receives the 4-bit (nibble) packet data on line mii_txd[3:0] from the RMII to MII Translation unit 310. The PCS unit 320 also receives an enable signal on line mii_tx_en from the RMII to MII Translation unit 310. The 4-bit (nibble) packet data is encoded in 4B5B Encoder 340 as a constant stream of 5-bit code-groups. The IEEE 802.3 Specification also defines an IDLE code-group as well as specific control code-groups to indicate Start of Packet, End of Packet, and error conditions. The packet encapsulation, using control code-groups, is shown in FIG. 24-5 of the IEEE 802.3 Specification. For convenience, FIG. 4 of this patent document sets forth FIG. 24-5 of the IEEE 802.3 Specification.

In sending a frame, the PCS unit 320 replaces the first byte of Preamble with a Start of Stream Delimiter ("SSD") that consists of the two code-groups /J/ and /K/. At the end of the frame transmission, the PCS unit 320 appends an End of Stream Delimiter ("ESD") that consists of the two code-groups /T/ and /R/ prior to resuming transmission of the IDLE code-groups /I/. Therefore an encapsulated packet will have the form /I/I/J/K/<data code-groups>/T/R/I/I/I/ where IDLE code-groups are sent continuously before and after the frame.

In all cases the IEEE 802.3 Specification defines transmit data to be sent as groups of five data bits including IDLE code-groups. The code-group requirements for transmit data are apparent in the Transmit state diagrams set forth and described in FIG. 24-7 and FIG. 24-8 of the IEEE 802.3 Specification.

One of the consequences of the definition as set forth in the IEEE 802.3 Specification is that the device must generate a constant 125 MHz Transmit Clock, and consistently transmit code-group data using the same phase of that 125 MHz Transmit Clock, as controlled by the Transmit Bits State Diagram (FIG. 24-7 of the IEEE 802.3 Specification). Therefore, the transmitter will consistently begin code-group transmissions on one of the five phases of the 125 MHz Transmit Clock. Because the transmit phase must be selected prior to the first packet transmission (because the IDLE code-groups must be sent for a long period prior to establishing a good link status), there is no fixed alignment of the 50 MHz reference clock to the 125 MHz Transmit Clock phase that is used to transmit the code-group data.

FIG. 5 illustrates the possible relationships between the 50 MHz reference clock and the phase of the 125 MHz Transmit Clock that generates the "sentCodeGroup.indicate" control signal as defined by the Transmit Bits state diagram. FIG. 5 is designed primarily to illustrate the relationships between the clocks and does not attempt to accurately model clock skews or overall data latency.

The first waveform 510 in FIG. 5 is the 50 MHz reference clock signal REF_CLK. The second waveform 520 in FIG. 5 is the 125 MHz Transmit Clock signal TX_CLK. The third through seventh waveforms (530 to 570) represent each of the five successive phases of the 125 MHz Transmit Clock.

For a given phase relationship (e.g., Phase 2) the delay from the reference clock REF_CLK positive edge to the "sentCodeGroup.indicate" signal varies by twenty nanoseconds (20 ns). As shown in FIG. 5, for data generated from the positive edge of the first pulse of REF_CLK ("Edge 1"), the delay to the next Phase 2 pulse is essentially one (1) Transmit Clock cycle or eight nanoseconds (8 ns). For data generated from the positive edge of the second pulse of REF_CLK ("Edge 2"), the delay to the next Phase 2 pulse is essentially three and one half (3.5) Transmit Clock cycles or twenty eight nanosecond (28 ns). Therefore, there is a twenty nanosecond (20 ns) difference in data latency that depends on the REF_CLK edge that is used to transfer the RMII data.

The minimum twenty nanoseconds (20 ns) uncertainty is dependent upon the device providing a consistent phase relationship between the reference clock signal REF_CLK and the "divide-by-five" circuit that creates the sentCodeGroup signal (such that only one of the phases is possible). If there is not a consistent relationship between the two functions, then any phase is possible and the uncertainty could be larger than twenty nanoseconds (20 ns). For example, Edge 1 to the next Phase 1 pulse is zero nanoseconds (0 ns) while Edge 2 to the next Phase 3 pulse is thirty six nanoseconds (36 ns).

As previously mentioned, there is a need in the art for a system and method that can significantly reduce the transmit latency uncertainty in 100 Mb RMII Ethernet physical layer devices from its current minimum value of approximately twenty nanoseconds (20 ns).

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 10A illustrates timing diagrams of a simulation of a first operation of an RMII transmit layer device of the present invention using a first edge of a reference clock; and FIG. 10B illustrates timing diagrams of a simulation of a second operation of an RMII transmit layer device of the present invention using a second edge of a reference clock.

DETAILED DESCRIPTION OF THE INVENTION

Figure 1:
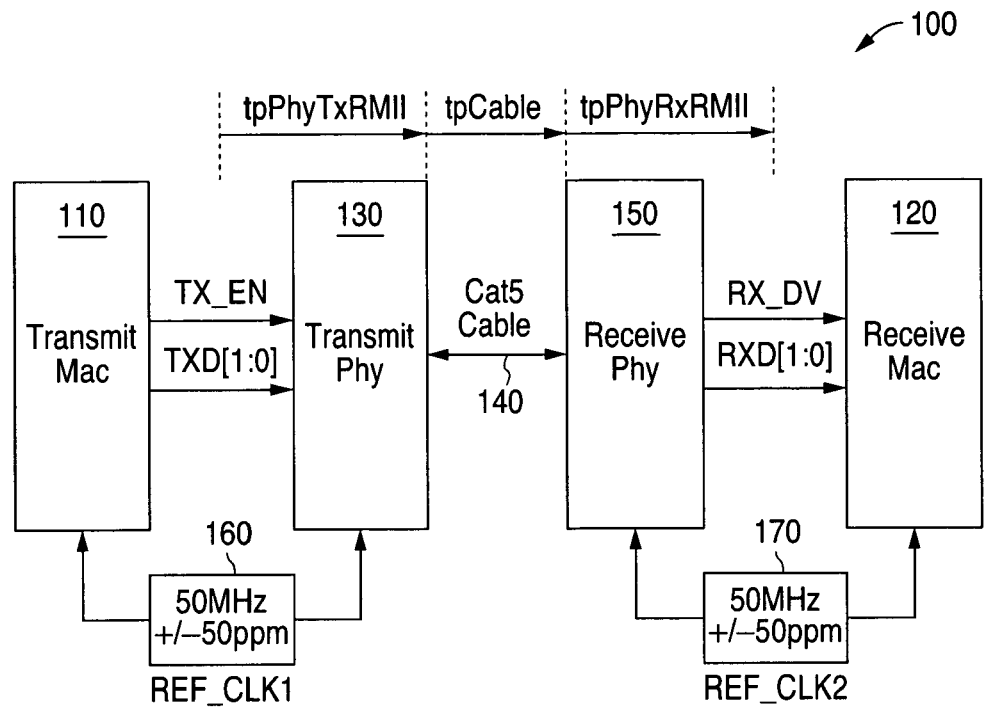
FIG. 1 illustrates a system timing diagram for a prior art RMII System.
Figure 2:
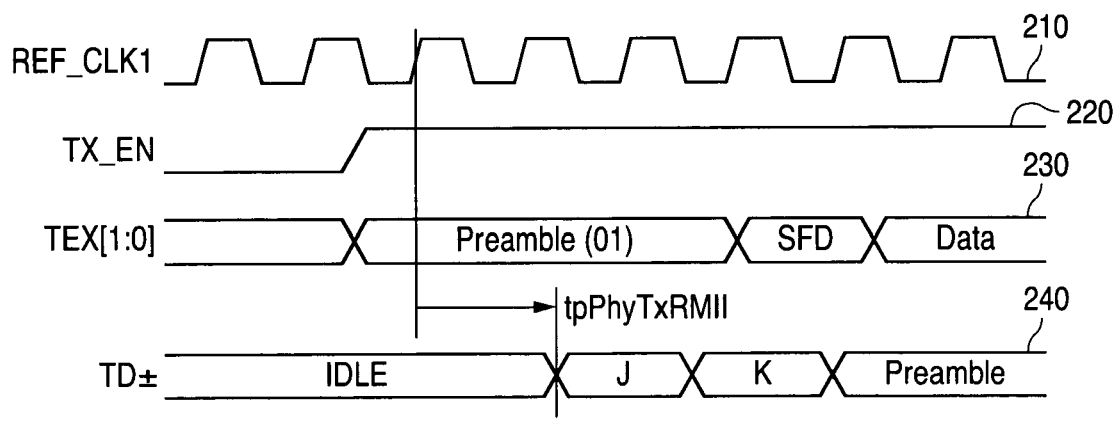
FIG. 2 illustrates a diagram showing the transmit delay in a prior art RMII transmit physical layer device.
Figure 3:
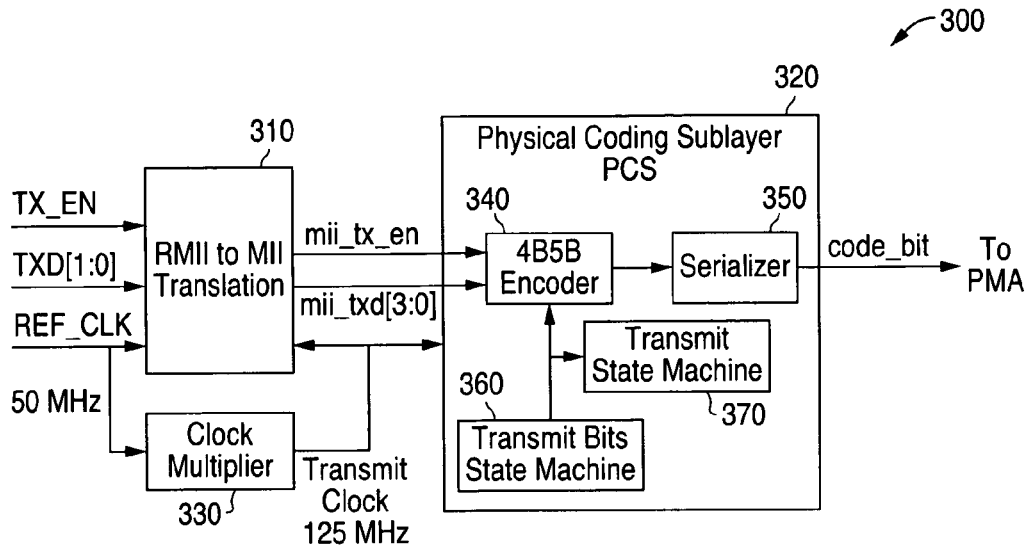
FIG. 3 illustrates a block diagram of a prior art RMII to MII Translation unit and a prior art Physical Coding Sublayer ("PCS") unit.
Figure 4:
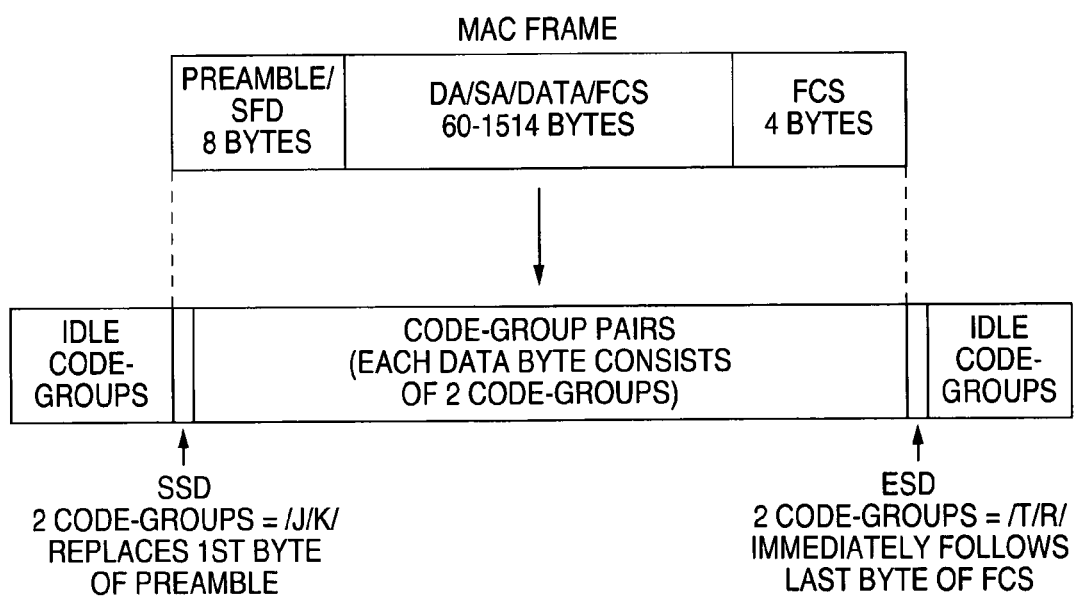
FIG. 4 illustrates a frame encapsulation diagram for a Physical Coding Sublayer ("PCS") packet.

FIGS. 6 through 10, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged network physical layer device.

The present invention comprises a system and method that modifies the transmit operation of a 100BASE-X transmitter in order to minimize the transmit latency uncertainty. Before describing the modification of the transmit operation, we first consider the operation of a 100BASE-X receiver. The operation of the Physical Coding Sublayer ("PCS") of a 100BASE-X receiver is described in Clause 24 of the IEEE 802.3 Specification.

The receiver operates on a stream of single bits as recovered from the physical medium. The receiver is required to detect the start of packet data and align the received data bits into five-bit data code-groups. The receiver is thus not dependent on the IDLE bits being received as an integer number of IDLE code-groups. The IDLE code-group is a pattern of all ones (represented by the notation 5'b11111) such that any number of these bits will still appear as an IDLE stream. The notation "5'b" stands for "five bit binary data."

Because the receiver does not require IDLE to be sent as an integer number of code-groups, it is possible to modify the transmitter to send the IDLE signal as a bit stream instead of as an integer number of IDLE code-groups. The need to adjust the IDLE stream only occurs for the first packet because all subsequent packets should be transferred using the same phase as the fifty megaHertz (50 MHz) reference clock.

The result of this modification is that the transmitter will send a series of IDLE code-groups, potentially followed by one to four additional IDLE bits before sending the Start of Stream Delimiter ("SSD"). Because the IDLE code-group is defined as five (5) ones (5'b11111) and the additional IDLE bits are also ones, the resultant stream of bits will still be an uninterrupted stream of IDLE bits followed by a valid Start of Stream Delimiter ("SSD"). The receiver will thus be able to correctly detect the SSD and determine appropriate code-group boundaries for the recovered data. The fact that the IDLE stream is not an integer number of code-groups is transparent to the receiver.

The phase of the 125 MHz transmit clock (from the clock multiplier 330) that is used to transfer code-group data is normally generated by a divide-by-five circuit as defined by the Transmit Bits State Machine 360 of the IEEE 802.3 specification. Normally the divide-by-five circuit is a continuously running circuit. The divide-by-five circuit determines the phase of the 125 MHz transmit clock to use to transfer data from the RMII interface 310 to the 125 MHz 4B5B encoder 340 and the 125 MHz serializer 350. In the IEEE 802.3 specification, this is the "sentCodeGroup.indicate" control signal.

In the present invention, when the first nibble data transfer across the RMII is detected, the divide-by-five circuit is reset (or re-aligned) so that the optimal phase of the 125 MHz transmit clock is selected for transferring the packet data. This is done by forcing the Transmit Bits process to jump to a specific state. All subsequent packet data is transferred using this selected phase of the 125 MHz Transmit Clock.

The RMII to MII Translation unit translates di-bit data from the RMII interface to nibble data and generates a "transmit enable" signal (designated "rmii_tx_en_ref"). The nibble data is transferred from the reference clock domain (50 MHz) to the transmit clock domain (125 MHz). To transmit the data, the transmit enable signal "rmii_tx_en_ref" is synchronized to the transmit clock domain. The synchronized transmit enable signal is designated "txen_sync".

In one advantageous embodiment a reset circuit of the present invention is located in the RMII to MII Translation unit. The reset circuit detects the start of frame transmission and generates a signal that is designated "rmii_txen_pulse." The rmii_txen_pulse signal marks the first nibble of data to be transferred to the 4B5B encoder on the internal MII data interface.

The reset circuit that generate the "rmii_txen_pulse" signal comprises an edge detection circuit on the synchronized transmit enable signal "txen_sync". At the initial rising edge of the synchronized transmit enable signal "txen_sync", the reset circuit will generate a signal that is high for a single clock pulse.

A Verilog HDL (Hardware Description Language) description of the reset circuit is set forth below. The description also includes a two-clock synchronization of the transmit enable signal "rmii_tx_en_ref".

```
reg tx_sync;
reg txen_sync0;
reg txen_sync_dly;
always@(posedge clock_125_ref)
begin
  txen_sync0<=#1 rmii_tx_en_ref;
  txen_sync<=#1 txen_sync0;
  txen_sync_dly<=#1 txen_sync;
end
wire txen_pulse=txen_sync && ~txen_sync_dly;
wire rmii_pulse=txen_pulse && ~sync_opt_dis;
```

The txen_sync_dly signal is a one clock delayed version of txen_sync. The rmii_txen_pulse will be asserted only when txen_pulse is TRUE and txen_sync_dly is FALSE. This will occur at the rising edge of txen_sync. To allow backwardly compatible operation with the prior art, the rmii_txen_pulse may be disabled using a control signal (designated "sync_opt_dis"). If the sync_opt_dis signal is asserted, then the rmii_txen_pulse will not assert and no reset or realignment of the divide-by-five circuit in the Transmit Bits State Machine will occur.

In one advantageous embodiment the reset circuit of the present invention is located in the RMII to MII Translation unit in the manner described above. It is understood, however, that in another advantageous embodiment the reset circuit of the present invention could be located in the Physical Coding Sublayer ("PCS").

Figure 6:
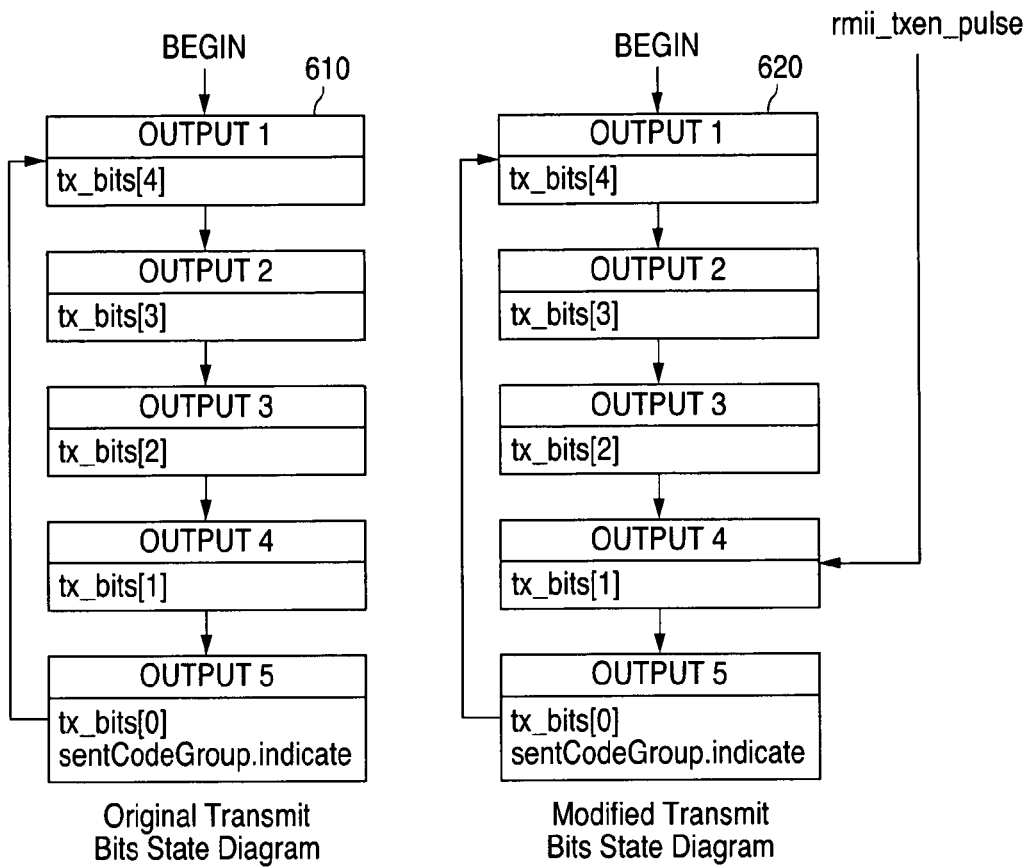
FIG. 6 illustrates a Transmit Bits state diagram in accordance with the prior art and a Transmit Bits state diagram in accordance with the principles of the present invention.

FIG. 6 illustrates an original (i.e., prior art) Transmit Bits state diagram 610. FIG. 6 also illustrates a Transmit Bits state diagram 620 that has been modified in accordance with the principles of the present invention. As shown in FIG. 6, the initial state of the prior art Transmit Bits state diagram 610 assigns transmit bits tx_bits[4] as the first output (OUTPUT 1). The second output (OUTPUT 2) is tx_bits[3]. The third output (OUTPUT 3) is tx_bits[2]. The fourth output (OUTPUT 4) is tx_bits[1]. The fifth output (OUTPUT 5) is tx_bits[0] and the signal "sentCodeGroup.indicate".

The Transmit Bits state diagram 620 of the present invention has the same general form. However, in the Transmit Bits state diagram 620, the "rmii_txen_pulse" signal from the RMII to MII Translation unit (not shown in FIG. 6) is provided as an input to the state machine. Assertion of the rmii_txen_pulse signal forces the state machine to transfer to the OUTPUT 4 state independent of the previous state. For example, if the rmii_txen_pulse signal is asserted while the state machine is in the OUTPUT 2 state, then the state machine will transition directly to the OUTPUT 4 state, bypassing the normal transition to the OUTPUT 3 state.

The transfer to the OUTPUT 4 state is shown as an example. The actual destination state is dependent on how the rmii_txen_pulse is generated and the actual implementation of the data path. For example, with a slight change to the data path pipeline, the transition could easily be made to the OUTPUT 5 state instead of to the OUTPUT 4 state.

The particular destination state is not important because the purpose of the present invention is to provide a consistent relationship between the start of the TX_EN signal and the "sentCodeGroup.indicate" control signal that is generated by the Transmit Bits process.

Figure 7A:
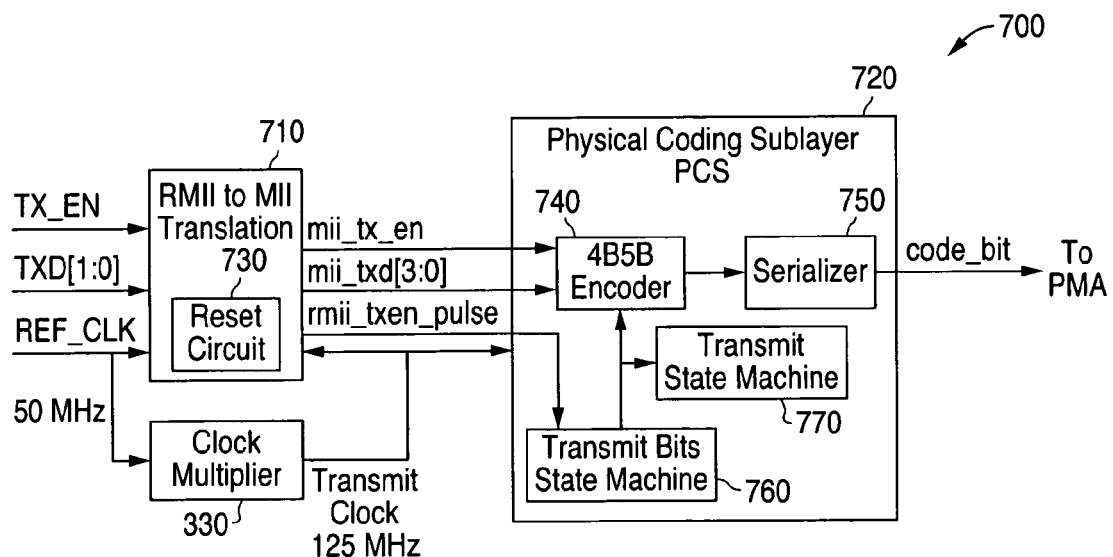
FIG. 7A illustrates a block diagram of an RMII to MII Translation unit and a Physical Coding Sublayer ("PCS") unit in accordance with the principles of the present invention.

FIG. 7A illustrates a block diagram 700 of an RMII to MII Translation unit 710 and a Physical Coding Sublayer ("PCS") unit 720 constructed in accordance with the principles of the present invention. The RMII to MII Translation unit 710 and the PCS unit 720 are modified versions of their prior art counterparts (RMII to MII Translation unit 310 and PCS unit 320) that carry out the generation and utilization of the rmii_txen_pulse signal. The RMII to MII Translation unit 710 comprises reset circuit 730 of the present invention.

The inputs to the RMII to MII Translation unit 710 from the Transmit Mac 110 are the transmit enable signal TX_EN and the data signal TXD[1:0]. The RMII to MII Translation unit 710 also receives the REF_CLK1 signal from the first reference clock 160. Because the second reference clock 170 is not involved in the determination of the transmit latency uncertainty, the first reference clock signal REF_CLK1 will simply be referred to as the reference clock signal REF_CLK.

As shown in FIG. 7A, the 50 MHz REF_CLK signal is provided to a Clock Multiplier unit 330. The Clock Multiplier unit 330 multiplies the clock signal REF_CLK signal to obtain a one hundred twenty five megaHertz (125 MHz) Transmit Clock signal. The Clock Multiplier unit 330 provides the 125 MHz Transmit Clock signal to both the RMII to MII Translation unit 710 and the Physical Coding Sublayer ("PCS") unit 720.

The PCS unit 720 comprises a 4B5B Encoder 740, a Serializer 750, a Transmit Bits State Machine 760, and a Transmit State Machine 770. The output of the PCS unit 720 is provided to a Physical Medium Attachment ("PMA") unit (not shown in FIG. 7A).

The reset circuit 730 in RMII to MII Translation unit 710 generates the rmii_txen_pulse as previously described and provides the signal (on a signal line designated "rmii_txen_pulse") to the Transmit Bits State Machine 760. When the rmii_txen_pulse is enabled, the Transmit Bits State Machine 760 is forced to transition to the OUTPUT 4 state in the manner previously described.

Figure 7B:
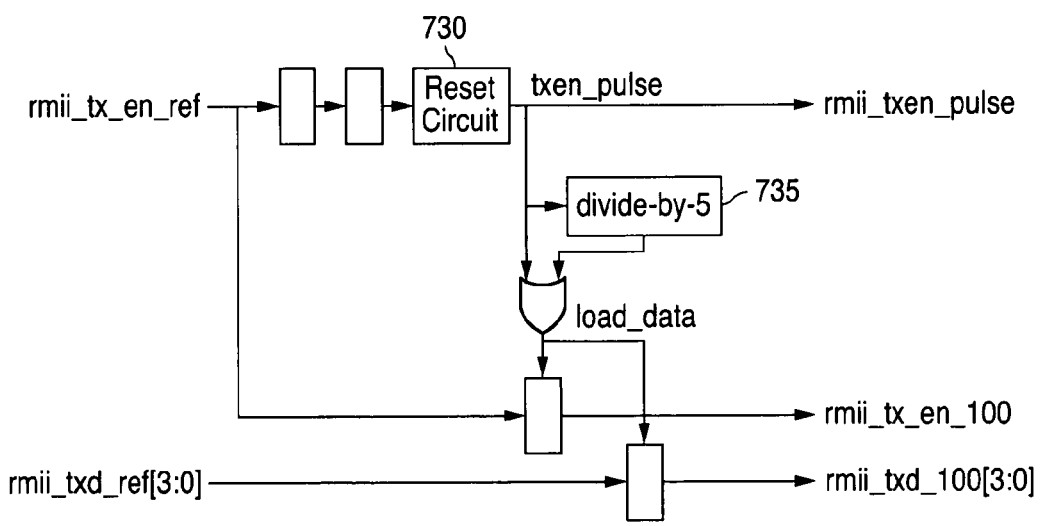
FIG. 7B illustrates a diagram showing an advantageous connection of reset circuit of the present invention with an exemplary divide-by-five circuit.

FIG. 7B illustrates a diagram showing an advantageous connection of reset circuit 730 of the present invention with a divide-by-five circuit 735. The circuitry shown in FIG. 7B samples the rmii_tx_en_ref signal into the transmit clock domain (125 MHz). An edge detected version of the rmii_tx_en_ref signal (designated "txen_pulse") is used to detect the initial packet data and to start divide-by-five counter 735. Upon assertion of the txen_pulse, the first data is loaded into the rmii_txd_100 register. From then on, as long as the rmii_tx_en_ref signal is asserted, new data will be loaded into the rmii_txd_100 register every five (5) clocks. In addition, a valid data signal is asserted for the rmii_txd_100 data register when loaded. Because of the two clock synchronization of the enable, data will always have a two to three clock setup time before sampling and a two to three clock hold time. This implementation takes advantage of the fact that the clocks are frequency locked and also that data will only transition every five clock cycles of the 125 MHz transmit clock.

When the reset circuit 730 of the present invention is activated the RMII interface aligns the transmit clock at the start of the packet data in the manner previously described. The rmii_txen_pulse signal is generated and used to reset the bit timer in the Transmit PCS module. The data realignment feature of the present invention may be disabled by setting a "mr_tx_opt_dis" control bit (not shown).

Figure 7C:
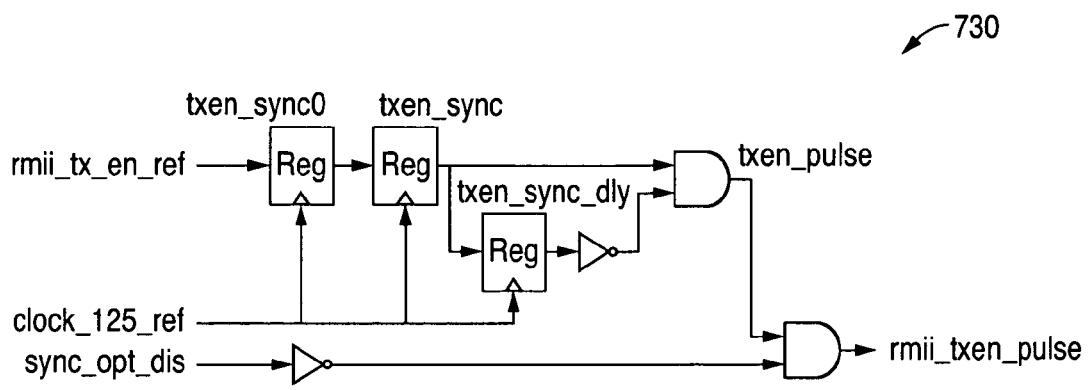
FIG. 7C illustrates a diagram of an advantageous embodiment of the reset circuit of the present invention.

FIG. 7C illustrates a diagram of an advantageous embodiment of reset circuit 730 of the present invention. The "rmii_txen_pulse" signal is generated by an edge detection circuit on the synchronized transmit enable signal "txen_sync". At the initial rising edge of the synchronized transmit enable signal, the reset circuit 730 generates a signal that is high for a single clock pulse.

Figure 8:
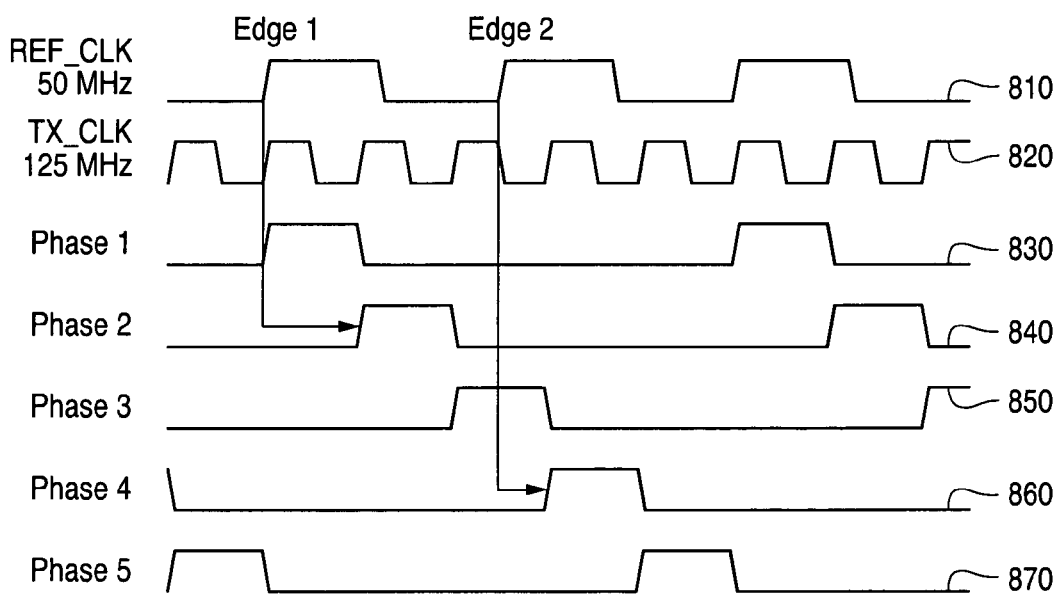
FIG. 8 illustrates timing diagrams that show the possible relationships between a reference clock and a phase of a transmit clock in accordance with the principles of the present invention.

FIG. 8 illustrates timing diagrams that show how the operation of the present invention reduces the transmit latency uncertainty down to four nanoseconds (4 ns). The first waveform 810 in FIG. 8 is the 50 MHz reference clock signal REF_CLK. The second waveform 820 in FIG. 8 is the 125 MHz Transmit Clock signal TX_CLK. The third through seventh waveforms (830 to 870) represent each of the five successive phases of the 125 MHz Transmit Clock.

Figure 5:
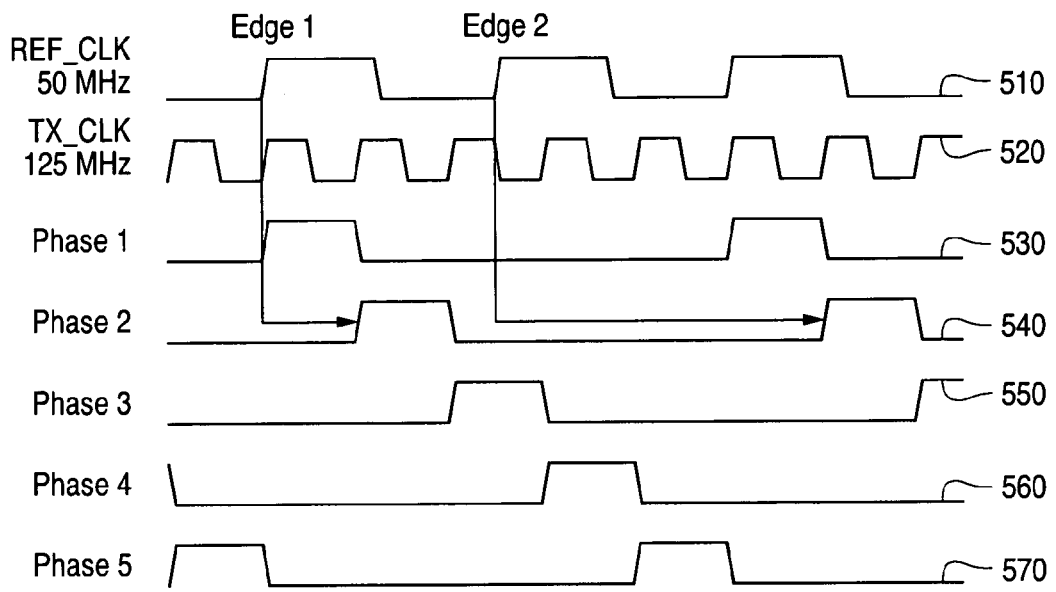
FIG. 5 illustrates timing diagrams that show the possible relationships between a reference clock and a phase of a transmit clock.

As previously described with respect to FIG. 5, if the prior art PCS unit 320 is restricted to maintaining a single phase, there is a twenty nanosecond (20 ns) uncertainty depending on the edge of the REF_CLK that is used to transfer data. The present invention allows the optimum phase of the 125 MHz transmit clock to be selected for sampling the data using the "sentCodeGroup.indicate" control signal. The present invention is capable of switching from one phase to another. In this manner the present invention provides a reset circuit that selects an optimum phase of the 125 MHz transmit clock for transmitting data.

As shown in FIG. 8, for Edge 1 (of waveform 810) the next available phase is Phase 1 (waveform 830). For Edge 2 (of waveform 810) the next available phase is Phase 4 (waveform 860). The delay difference in this case is equal to one half of the 125 MHz clock. One clock period of the 50 MHz reference clock represents a time interval of twenty nanoseconds (20 ns). One clock period of the 125 MHz transmit clock is eight nanoseconds (8 ns). The delay period is one half of eight nanoseconds (8 ns) or four nanoseconds (4 ns). This represents a five fold reduction in the transmit latency uncertainty from the prior art twenty nanosecond (20 ns) transmit latency uncertainty.

As was the case with FIG. 5, it is understood that FIG. 8 is designed primarily to illustrate the relationships between the clocks and does not attempt to accurately model clock skews or overall data latency.

Figure 9A:
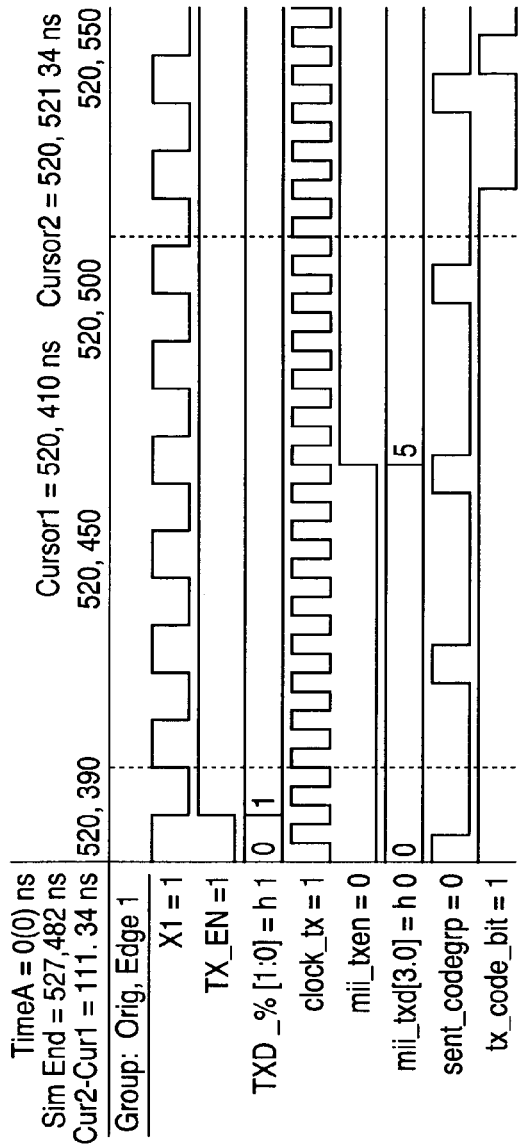
FIG. 9A illustrates timing diagrams of a simulation of a first operation of a prior art RMII transmit layer device using a first edge of a reference clock.

FIG. 9 illustrates timing diagrams of simulated results of an operation of a prior art RMII transmit physical layer device. FIG. 9A illustrates a first operation of a prior art RMII transmit layer device using Edge 1 of the reference clock. The first operation shown in FIG. 9A gives a latency of one hundred eleven and thirty four hundredths nanoseconds (111.34 ns).

Figure 9B:
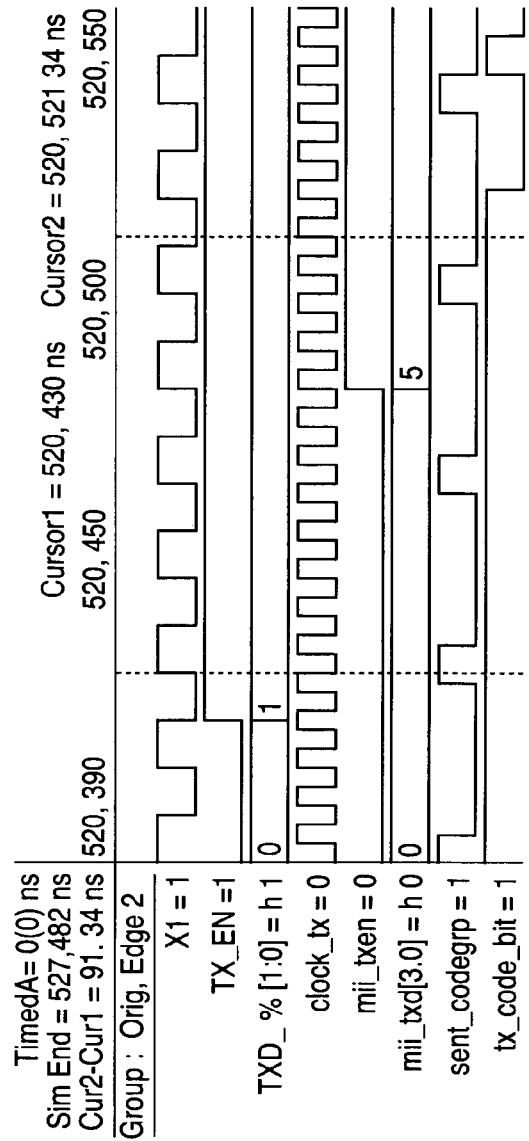
FIG. 9B illustrates timing diagrams of a simulation of a second operation of a prior art RMII transmit layer device using a second edge of a reference clock.

FIG. 9B illustrates a second operation of a prior art RMII transmit layer device using Edge 2 of the reference clock. The second operation shown in FIG. 9B gives a latency of ninety one and thirty four hundredths nanoseconds (91.34 ns). Therefore, the prior art transmit latency uncertainty is twenty nanoseconds (20 ns). This is because 111.34 nanoseconds minus 91.34 nanoseconds equals 20.00 nanoseconds.

The only difference between the simulation of the first operation (FIG. 9A) and the simulation of the second operation (FIG. 9B) is that the second operation begins the packet transfer one RMII clock cycle later than the first operation. In both simulations the latency is measured from the first rising X1 (RMII Reference Clock) following the TX_EN asserted to the first bit of the JK code-group pair (SSD) at the encoded NRZ serial data as sampled by the transmit clock.

This is shown at the PCS/PMA layer boundary prior to scrambling the data to allow easy comparison of the delay. The J code-group is "11000" so that the comparison point is two (2) rising clock edges before the "tx_code_bit" signal transitions from a "one" value ("1") to a "zero" value ("0"). The difference in the prior art latency is twenty nanoseconds (20 ns), or one ("1") reference clock cycle.

FIG. 10 illustrates timing diagrams of simulated results of an operation of an RMII transmit physical layer device in accordance with the principles of the present invention. FIG. 10A illustrates a first operation of an RMII transmit layer device of the present invention using Edge 1 of the reference clock. The first operation shown in FIG. 10A gives a latency of eighty seven and thirty four hundredths nanoseconds (87.34 ns). FIG. 10B illustrates a second operation of an RMII transmit layer device of the present invention using Edge 2 of the reference clock. The second operation shown in FIG. 10B gives a latency of eighty three and thirty four hundredths nanoseconds (83.34 ns). Therefore, the transmit latency uncertainty of the present invention is four nanoseconds (4 ns). This is because 87.34 nanoseconds minus 83.34 nanoseconds equals 4.00 nanoseconds.

Four nanoseconds (4 ns) represents a five fold reduction in the transmit latency uncertainty of twenty nanoseconds (20 ns) that is provided by a prior art RMII transmit layer device. The only difference between the simulation of the first operation (FIG. 10A) and the simulation of the second operation (FIG. 10B) is that the second operation begins the packet transfer one RMII clock cycle later than the first operation. In both simulations the latency is measured from the first rising X1 (RMII Reference Clock) following the TX_EN asserted to the first bit of the JK code-group pair (SSD) at the encoded NRZ serial data as sampled by the transmit clock.

The present invention reduces the difference in latency to four nanoseconds (4 ns). The remaining uncertainty is due to the fact that the transmit clock is not an integer multiple of the frequency of the reference clock. Therefore, one edge of the reference clock is aligned with the positive edge of the transmit clock, while the other edge of the reference clock is aligned with the negative edge of the transmit clock.

This means that in the case of Edge 1 there is an additional latency equal to one-half of the transmit clock period to sample the data to the positive clock edge of the transmit clock.

The "rmii_txen_pulse" signal sets the Transmit Bits state machine to the OUTPUT 4 state. In the waveforms this results in the assertion of the "sentCodeGroup.indicate" signal two clock periods later. Note that the "sentCodeGroup.indicate" signal is designated as "sent_codegrp" in FIG. 9 and in FIG. 10. In both simulations the "sent_codegrp" signal shifts from its normal divide-by-five operation, optimizing the latency by sending fewer that five ("5") IDLE bits for the final IDLE code-group.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus for minimizing transmit latency uncertainty in a transmit physical layer device that operates using a transmit clock signal and that comprises a divide circuit configured to select a phase of the transmit clock signal for transmitting data, the apparatus comprising:

a reset circuit that is configured to align the divide circuit to select an optimal phase of the transmit clock signal for transmitting the data.

2. The apparatus as set forth in claim 1, wherein the reset circuit is configured to provide a transmit latency uncertainty of approximately four nanoseconds.

3. The apparatus as set forth in claim 1, wherein the reset circuit is configured to align the divide circuit to select the optimal phase of the transmit clock signal by forcing a transmit bits state machine associated with the divide circuit to jump to a specified state.

4. The apparatus as set forth in claim 3, wherein the reset circuit is configured to force the transmit bits state machine to jump to the specified state without regard to a previous state in said of the transmit bits state machine.

5. The apparatus as set forth in claim 1, wherein the reset circuit is configured to align the divide circuit to select the optimal phase of the transmit clock signal when the reset circuit detects a first nibble of data to be transmitted.

6. The apparatus as set forth in claim 5, wherein data following the first nibble of data is transferred using the selected optimal phase of the transmit clock signal.

7. The apparatus as set forth in claim 1, wherein the transmit clock signal comprises a one hundred twenty five megaHertz clock signal, and the divide circuit comprises a divide-by-five circuit.

8. The apparatus as set forth in claim 1, wherein the reset circuit is configured to provide a transmit latency uncertainty that is at least approximately equal to one-half of a clock period of the transmit clock signal.

9. An apparatus for minimizing transmit latency uncertainty in an Ethernet transmit physical layer device that operates using a one hundred twenty five megaHertz (125 MHz) transmit clock signal and that comprises a divide-by-five circuit configured to select a phase of the transmit clock signal for transmitting data, the apparatus comprising:

a reset circuit that is configured to align the divide-by-five circuit to select an optimal phase of the transmit clock signal for transmitting the data.

10. The apparatus as set forth in claim 9, wherein the reset circuit is configured to provide a transmit latency uncertainty of approximately four nanoseconds.

11. The apparatus as set forth in claim 9, wherein the reset circuit is configured to align the divide-by-five circuit to select the optimal phase of the transmit clock signal by forcing a transmit bits state machine associated with the divide-by-five circuit to jump to a specified state.

12. The apparatus as set forth in claim 11, wherein the reset circuit is configured to force the transmit bits state machine to jump to the specified state without regard to a previous state of the transmit bits state machine.

13. The apparatus as set forth in claim 9, wherein the reset circuit is configured to align the divide-by-five circuit to select the optimal phase of the transmit clock signal when the reset circuit detects a first nibble of data to be transmitted.

14. The apparatus as set forth in claim 13, wherein data following the first nibble of data is transferred using the selected optimal phase of the transmit clock signal.

15. An apparatus for minimizing transmit latency uncertainty in an RMII Ethernet transmit physical layer device that comprises an RMII-to-MII translation unit and a physical coding sublayer that operate using a one hundred twenty five megaHertz (125 MHz) transmit clock signal, wherein the RMII-to-MII translation unit comprises a divide-by-five circuit configured to select a phase of the transmit clock signal for transmitting data, the apparatus comprising:

a reset circuit in the RMII-to-MII translation unit that is configured to align the divide-by-five circuit to select an optimal phase of the transmit clock signal for transmitting the data.

16. The apparatus as set forth in claim 15, wherein the reset circuit is configured to provide a transmit latency uncertainty of approximately four nanoseconds.

17. The apparatus as set forth in claim 15, wherein the reset circuit is configured to align the divide-by-five circuit to select the optimal phase of the transmit clock signal by forcing a transmit bits state machine that is associated with the divide-by-five circuit to jump to a specified state.

18. The apparatus as set forth in claim 15, wherein the reset circuit is configured to align the divide-by-five circuit to select the optimal phase of the transmit clock signal when the reset circuit detects a first nibble of data to be transmitted.

19. The apparatus as set forth in claim 17, wherein the reset circuit is configured to provide a signal to the transmit bits state machine to force the transmit bits state machine to jump to the specified state without regard to a previous state in said of the transmit bits state machine.

20. The apparatus as set forth in claim 18, wherein data following the first nibble of data is transferred using the selected optimal phase of the transmit clock signal.

* * * * *

UNITED STATES PATENT AND TRADEMARK OFFICE
CERTIFICATE OF CORRECTION

PATENT NO. : 7,715,445 B1
APPLICATION NO. : 11/374874
DATED : May 11, 2010
INVENTOR(S) : David R. Rosselot It is certified that error appears in the above-identified patent and that said Letters Patent is hereby corrected as shown below:

Column 11, claim 4, line 34, delete "in said"; and

Column 12, claim 19, line 50, delete "in said".

Signed and Sealed this
Twelfth Day of April, 2011

David J. Kappos
*Director of the United States Patent and Trademark Office*